(12) United States Patent
MacDonald (10) Patent No.: US 9,098,370 B2
(45) Date of Patent: Aug. 4, 2015

(54) APPARATUS AND METHODS FOR IMPROVING UNINSTALL PROCESS

(75) Inventor: Carl MacDonald, LaCenter, WA (US)

(73) Assignee: CBS INTERACTIVE, INC., New York, NY (US)

( * ) Notice: Subject to any disclaimer, the term of this patent is extended or adjusted under 35 U.S.C. 154(b) by 289 days.

(21) Appl. No.: 12/941,373

(22) Filed: Nov. 8, 2010

(65) Prior Publication Data

US 2012/0117127 A1    May 10, 2012

(51) Int. Cl.
*G06F 12/00*    (2006.01)
*G06F 9/445*    (2006.01)

(52) U.S. Cl.
CPC .......................................... *G06F 8/62* (2013.01)

(58) Field of Classification Search
CPC ... G06F 3/0481; G06F 3/0486; G06F 21/562; G06F 17/3012; G06F 17/30117; G06F 8/62
USPC ......... 717/168, 169, 170, 174, 175, 104, 176; 707/609, 640, 821, 822
See application file for complete search history.

(56) References Cited

U.S. PATENT DOCUMENTS

| 6,687,902 | B1 * | 2/2004 | Curtis et al. .................. 717/175 |
| 7,559,059 | B2 * | 7/2009 | Renaud ......................... 717/174 |
| 2002/0158909 | A1 * | 10/2002 | Negishi et al. ................. 345/769 |
| 2003/0220838 | A1 * | 11/2003 | Ishii et al. ........................ 705/14 |
| 2006/0120687 | A1 * | 6/2006 | Kida et al. ........................ 386/46 |
| 2008/0040388 | A1 * | 2/2008 | Petri et al. ................... 707/104.1 |
| 2008/0059946 | A1 * | 3/2008 | Harding et al. ............... 717/106 |
| 2008/0134169 | A1 * | 6/2008 | Williams et al. .............. 717/175 |
| 2008/0307333 | A1 * | 12/2008 | McInerney et al. ........... 715/764 |
| 2009/0064285 | A1 * | 3/2009 | Takahashi ......................... 726/4 |
| 2011/0113414 | A1 * | 5/2011 | Ewington et al. ............. 717/168 |

* cited by examiner

*Primary Examiner* — Md. I Uddin
(74) *Attorney, Agent, or Firm* — Kacvinsky Daisak Bluni PLLC (57) ABSTRACT

Various embodiments for improving application uninstallation from a computing device are described. In one or more embodiments, a scanning application may generate a files list that includes information about what other applications may use ancillary files. When an application is deleted, a user interface presents a list of ancillary files used by the deleted application and what other applications may use the ancillary files. The user may then select which ancillary files to delete along with the application. Other embodiments are described and claimed.

10 Claims, 6 Drawing Sheets

| | 310 | 320 | 330 | 340 | 350 | 360 |
|---|---|---|---|---|---|---|
| 302 ▶ | File Name | App Name | Version | Bundle ID | Assoc. Apps | Location |
| 304 ▶ | File Name | App Name | Version | Bundle ID | Assoc. Apps | Location |
| | File Name | App Name | Version | Bundle ID | Assoc. Apps | Location |

| File Name | Location | Version | May Be Used By | |
|---|---|---|---|---|
| FileName1 | Location | Version | App1, App2 | DELETE |
| FileName2 | Location | Version | - | DELETE |
| FileName3 | Location | Version | App2 | DELETE |

APPARATUS AND METHODS FOR IMPROVING UNINSTALL PROCESS

BACKGROUND

When software applications are installed onto a computing device, ancillary files are often installed in addition to the executable application file. These ancillary files may reside in different directory locations from the application itself. When the application is later uninstalled, the ancillary files may not be removed, which may consume storage resources. In addition, the ancillary files may be used by more than one application. If the user removes the ancillary files manually, performance of the other applications may be affected. Accordingly, there may be a need for an improved apparatus and methods for uninstalling applications more thoroughly without negatively impacting application performance.

DETAILED DESCRIPTION

Various embodiments are directed to improving the process of uninstalling applications from a computing device. Embodiments may include an application that scans the storage media for a computing device to identify ancillary files, and to identify what other applications may use the ancillary files. When a user attempts to delete an application, the scanning application may provide an interface to the user that lists the ancillary files and what other applications may use them. The user may then select which ancillary files to delete. The scanning application may be independent of the applications being deleted and of the operating system of the computing device.

Figure 1:
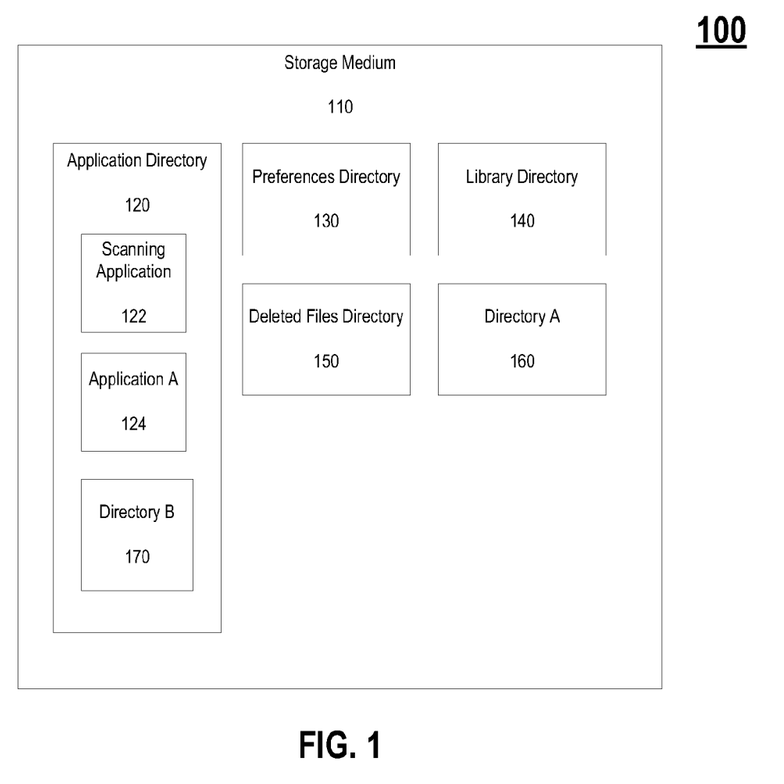
FIG. 1 illustrates a system for improving uninstallation in accordance with one or more embodiments.

FIG. 1 illustrates a system 100 to improve the process of uninstalling an application from a computer-readable storage medium. In one embodiment, for example, the system 100 may comprise a computer-implemented system having multiple components, such as computer-readable storage medium 110. Storage medium 110 may store multiple files, such as applications, documents, library files, preference files, etc.

Storage medium 110 may have a logical file organization structure. Storage medium 110 may include, for example, an application directory 120, a preferences directory 130, a library directory 140, a deleted files directory 150, and/or other directories, such as directory A 160. Embodiments are not limited to these examples, and other logical storage structures may be used without departing from the spirit of the invention. Although one storage medium is shown, embodiments may include multiple storage media.

As used herein the terms "system" and "component" are intended to refer to a computer-related entity, comprising either hardware, a combination of hardware and software, software, or software in execution. For example, a component can be implemented as a process running on logic device, a logic device, a hard disk drive, multiple storage drives (of optical and/or magnetic storage medium), an object, an executable, a thread of execution, a program, and/or a computer. Examples of a logic device include, without limitation, a central processing unit (CPU), microcontroller, microprocessor, general purpose processor, dedicated processor, chip multiprocessor (CMP), media processor, digital signal processor (DSP), network processor, co-processor, input/output processor, application specific integrated circuit (ASIC), field programmable gate array (FPGA), programmable logic device (PLD), and so forth. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the system 100 may be implemented by one or more electronic computing devices. Examples of an electronic computing device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the system 100 as shown in FIG. 1 has a limited number of elements in a certain topology, it may be appreciated that the system 100 may include more or less elements in alternate topologies as desired for a given implementation.

The components of system 100 may be communicatively coupled via various types of communications media. The components may coordinate operations between each other. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Examples of connections may include parallel interfaces, serial interfaces, and bus interfaces.

In an embodiment, system 100 may include scanning application 122. Scanning application 122 may scan storage medium 110, and other computer-readable storage media accessible to scanning application 122. Scanning application 122 may scan all files on storage medium 110, or may scan files only in specified directories. Scanning application 122 may be used by other applications, for example, an application that scans files to identify files for which updates are available. Scanning application 122 is discussed further in FIG. 2.

In an embodiment, system 100 may store most or all applications in application directory 120. Application directory 120 may include scanning application 122, and other applications, such as application A 124. Application directory 120 may also have sub-directories, such as directory B 170. An application may include executable software instructions, typically embodied in at least one executable file. Applications may be independent of the operating system on the computing device, meaning that they are stand-alone programs that may be started and stopped by the user of the device, rather than being a component of the operating system. An application may create and/or use ancillary files, such as preference files, library files, and/or data files. The ancillary files may be stored in various locations, such as application directory 120, directory B 170, preferences directory 130, library directory 140, or directory A 160.

Preferences directory 130 may contain files that are used by applications to operate according to settings chosen by the user. Library directory 140 may contain files that provide specific functionality, such as subroutines, to applications. Deleted files directory 150 may contain files that the user has chosen to delete, but that have not yet been logically removed from the storage medium. Deleted files directory 150 may correspond, for example, to the MacOS® Trash Can or the Microsoft Windows® Recycle Bin. The embodiments are not limited in this context.

Figure 2:
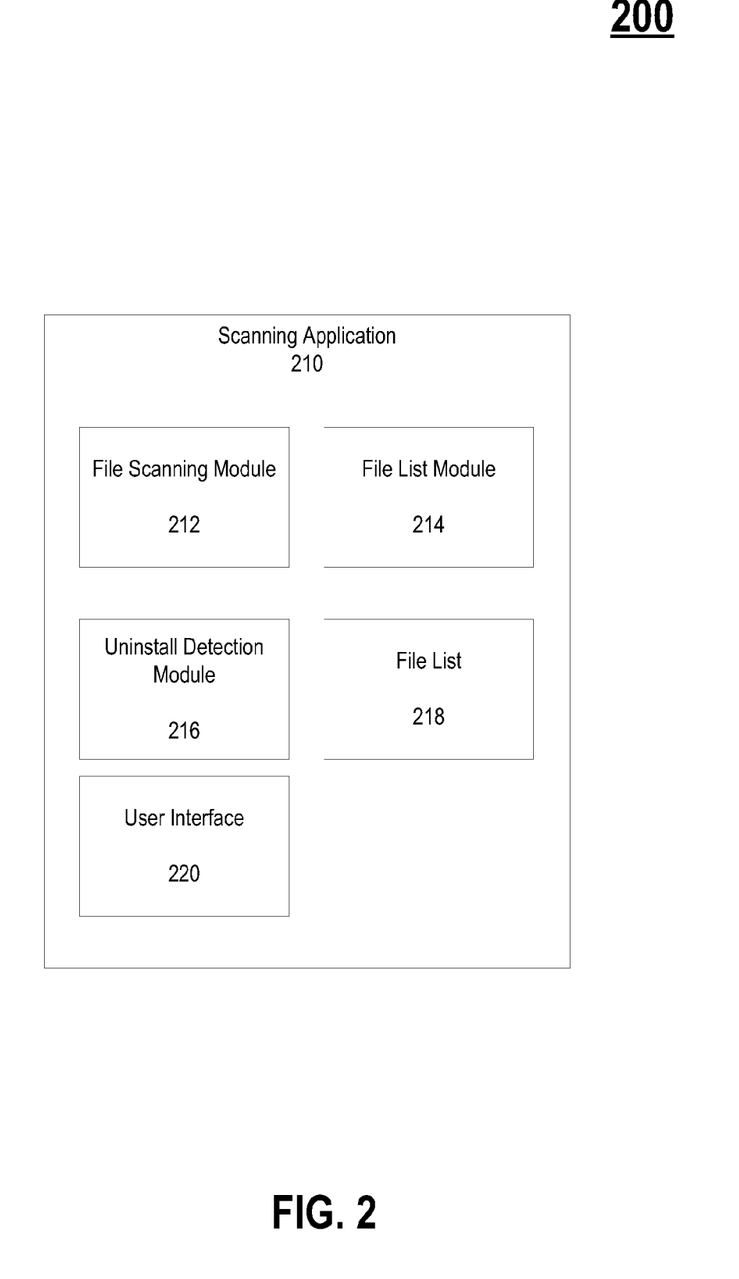
FIG. 2 illustrates a scanning application in accordance with one or more embodiments.

FIG. 2 illustrates a block diagram 200 of a scanning application 210. Scanning application 210 may represent an embodiment of scanning application 122. For example, scanning application 210 may comprise one or more functional modules to perform the actions of improving the uninstall process. Scanning application 210 may include, for example, a file scanning module 212, a file list module 214, an uninstall detection module 216 and a user interface 220. The embodiments are not limited to these examples.

File scanning module 212 may scan some or all of the files in one or more computer-readable storage media, such as storage medium 110. Scanning may include visiting each file and obtaining file metadata about each visited file. File metadata may include, for example, but not limited to, a bundle ID, a filename, a version, and/or an application name. Bundle ID may be an identifier assigned to all files associated with an application, or a related suite of applications, when installed. Version may identify with which version of an application the file is associated. Application name may identify the particular application that uses the file.

File list module 214 may generate and maintain a file list 218. File list 218 may contain some or all of the file metadata gathered by file scanning module 212 for each file. File list 218 may be used to identify ancillary files associated with an application. File list module 214 may also generate a file list specific to an application when the application is deleted.

Uninstall detection module 216 may detect when an application is deleted by the user. For example, uninstall detection module 216 may detect when an application is moved from its directory to the deleted files directory 150. Detecting a deleted application may cause file list module 214 to generate the application-specific file list.

User interface 220 may be displayed when uninstall detection module 216 detects an application deletion. User interface 220 may identify which ancillary files are associated with the deleted application and display a list of those files to the user. User interface 220 may compare the application-specific file list to file list 218 to identify the associated ancillary files and to determine what other applications may use the ancillary files. The displayed list may show the user what, if any, other applications may use each ancillary file. The user may then select which ancillary files to delete along with the deleted application.

In an embodiment (not shown), scanning application 122 may scan the computer-readable storage media and generate file list 218, while a separate application may detect deletion of an application, read the file list and display the list of files associated with the deleted application.

Generally, scanning application 122 and its functional modules described herein may be independent of both the operating system in operation on the computing device, and of the other applications. In contrast, conventionally, some applications provide their own uninstallation application, which may consume additional storage resources in addition to placing a burden on each application developer to provide the uninstallation application. Other applications may rely on the operating system to clean up ancillary files. In either case, uninstallation may not identify all of the relevant files and/or the other applications that may use the ancillary files.

Figure 3:
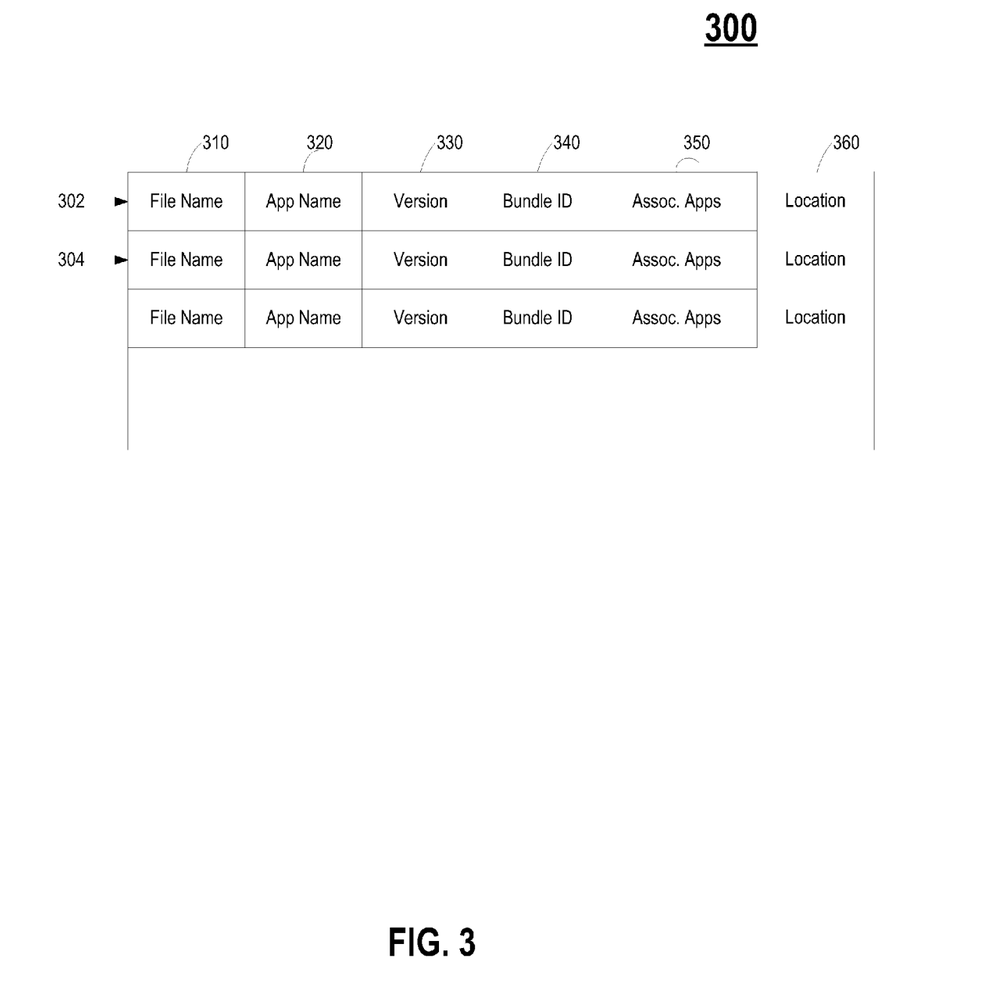
FIG. 3 illustrates a file list in accordance with one or more embodiments.

FIG. 3 illustrates an embodiment of a file list 300. File list 300 may be an example of file list 218. File list 300 may include an entry for each scanned file, such as entry 302 and entry 304. Each entry may have one or more fields containing information about the file. The information may include file metadata and other information that may be used to identify ancillary files associated with applications. For example, an entry may include file name 310, application name 320, version 330, bundle ID 340, associated applications 350 and location 360.

Figure 4:
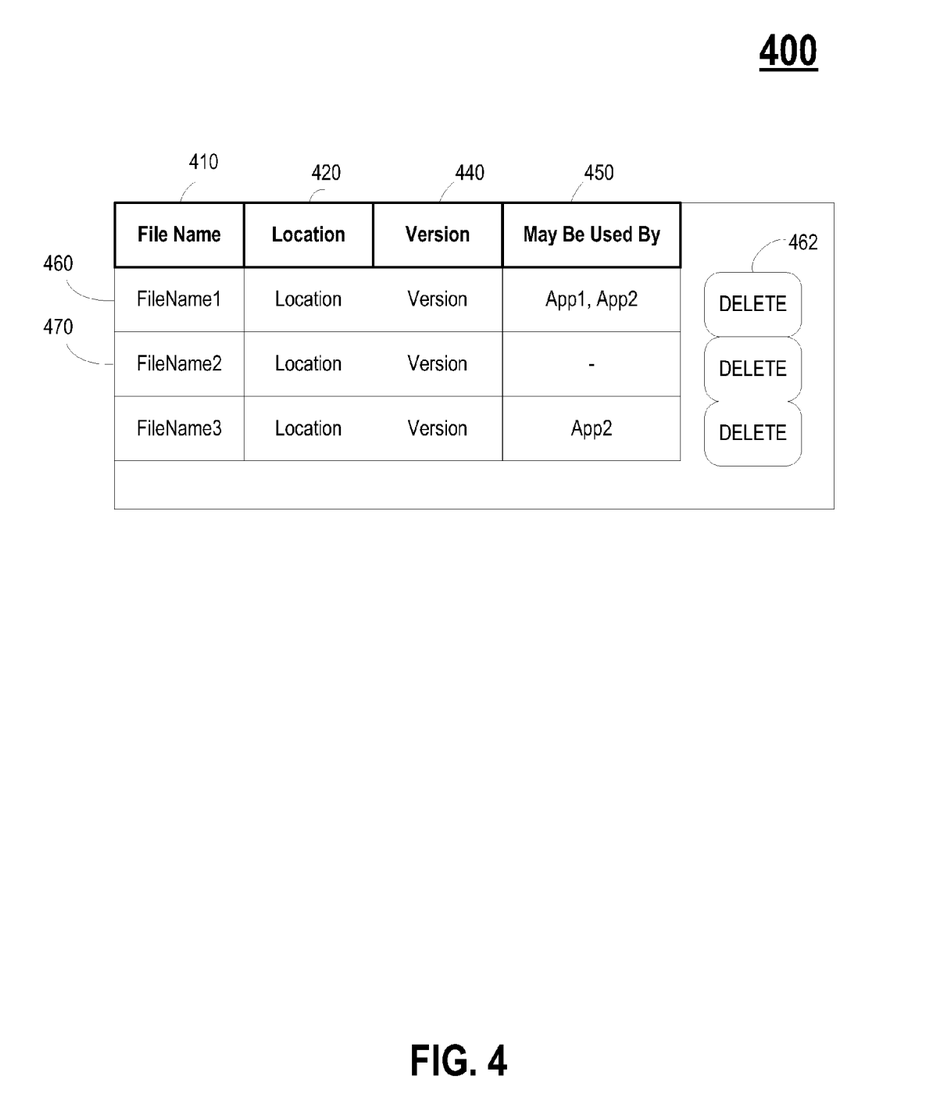
FIG. 4 illustrates a user interface in accordance with one or more embodiments.

FIG. 4 illustrates an embodiment of a user interface 400. User interface 400 may be an example of user interface 220. User interface 400 may display a table-like format that shows a row, such as row 460 and 470, for each ancillary file that may be associated with a deleted application. Each row may display some information about the file to assist the user in deciding whether to delete the file. For example, user interface 400 may display the file name 410, location 420, version 440, and the applications that may use the file 450. User interface 400 may provide a delete button 462 or other selection mechanism to allow the user to select individual files and/or all files in the list for deletion.

Figure 5:
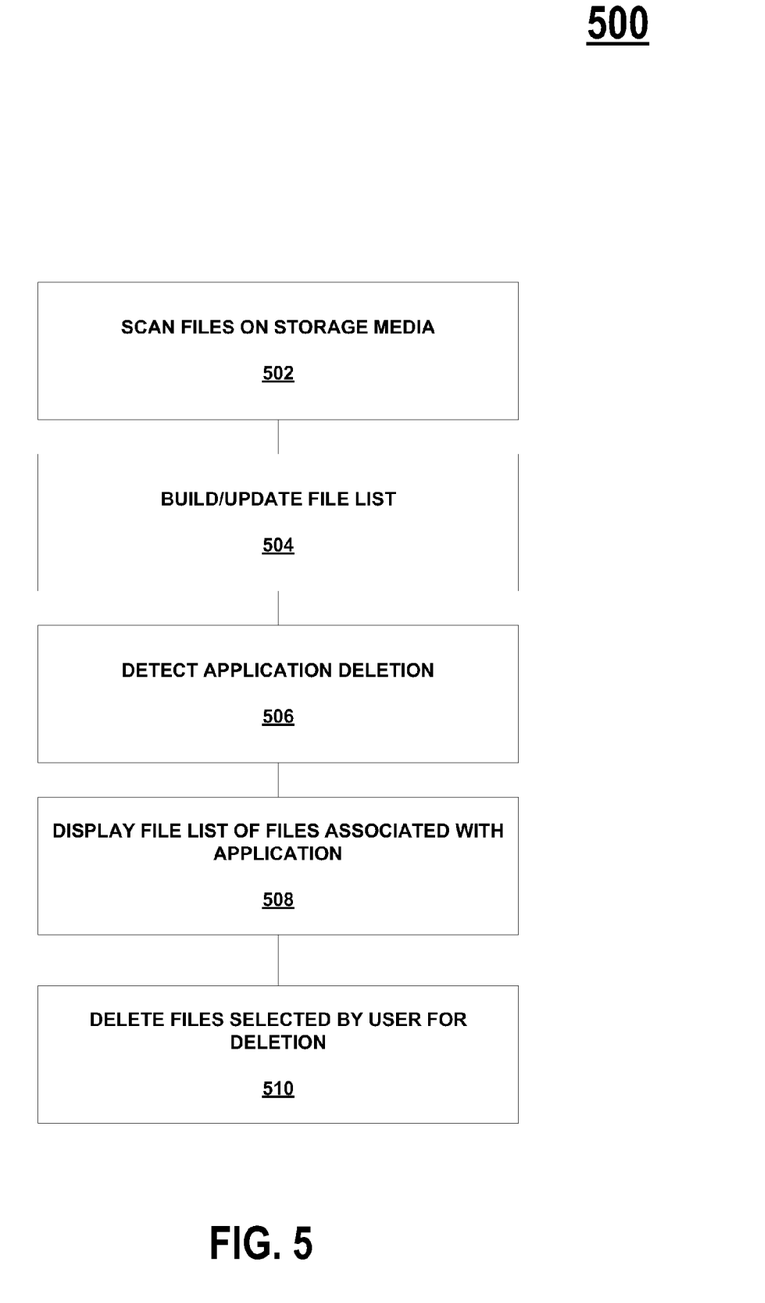
FIG. 5 illustrates a logic flow in accordance with one or more embodiments.

FIG. 5 illustrates logic flow 500 in accordance with one or more embodiments. The logic flow 500 may be performed by various systems and/or devices and may be implemented as hardware, software, and/or any combination thereof, as desired for a given set of design parameters or performance constraints. For example, the logic flow 500 may be implemented by a logic device (e.g., processor) and/or logic (e.g., threading logic) comprising instructions, data, and/or code to be executed by a logic device. For purposes of illustration, and not limitation, the logic flow 500 is described with reference to the figures. The embodiments are not limited in this context.

In various embodiments, the logic flow 500 may scan files on one or more storage media in block 502. For example, scanning application 122 may scan all files in one or more specified directories, or all files on one or more computer-readable storage media. Scanning may include visiting each file and obtaining file metadata about each visited file. Scanning may take place automatically at periodic intervals, such as daily or weekly. Scanning may also take place on events, such as an application installation, update or when initiated by the user.

The logic flow 500 may build and update a file list in block 504. For example, scanning application 122, using file list module 214 may generate a file list 218 the first time that it scans. Scanning application 122 may then update the file list at each scan. The file list may include information about each scanned file that may be used to identify which applications may use the file.

The logic flow 500 may detect deletion of an application in block 506. For example, scanning application 122, using uninstall detection module 216 may detect when a user drags an application file to the deleted files directory 150 (e.g. trash or recycle bin), or when a user selects an application file and uses a keyboard delete key or menu delete function to move the file to the deleted files directory 150.

The logic flow 500 may display a list of files associated with the deleted application in block 508. For example, when uninstall detection module 216 detects a deleted application, it may cause scanning application 122 to start user interface 220. User interface 220 may inspect file list 218 to identify ancillary files that may be associated with the deleted application and display the identified ancillary files.

The logic flow 500 may delete files selected by the user for deletion in block 510. For example, user interface 220 may receive selections of buttons or checkboxes indicating which files in the displayed list the user wishes to delete. User interface 220 may then move the selected files to the deleted files directory 150.

Figure 6:
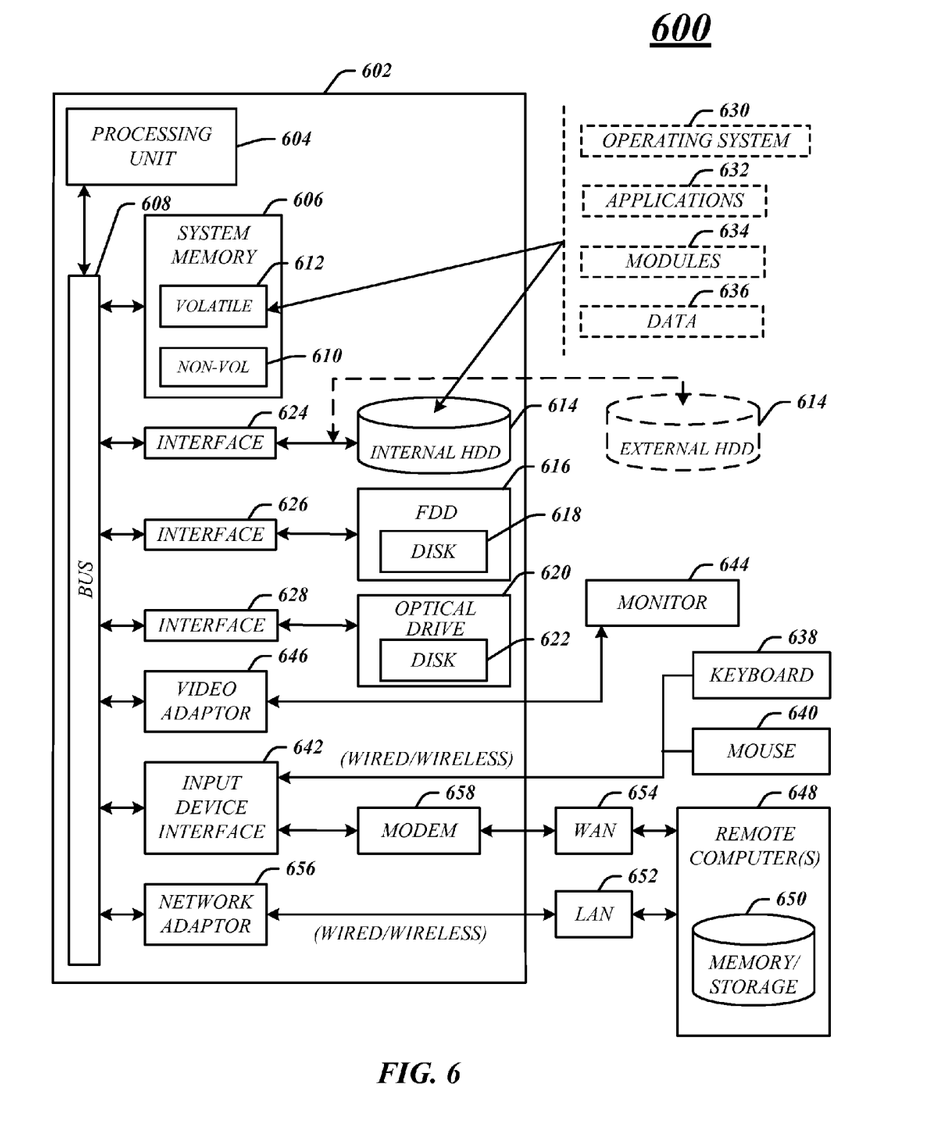
FIG. 6 illustrates a computing architecture in accordance with one or more embodiments.

FIG. 6 illustrates a computer architecture in accordance with one or more embodiments, suitable for implementing various embodiments as previously described. The computing architecture 600 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors. Dual microprocessors and other multi-processor architectures may also be employed as the processing unit 604. The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures.

The system memory 606 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media, including an internal hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable storage media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. The one or more application programs 632, other program modules 634, and program data 636 can include, for example, scanning application 122, file scanning module 212, file list module 214, and/or uninstall detection module 216.

A user can enter commands and information into the computer 602 through one or more wire/wireless input devices, for example, a keyboard 638 and a pointing device, such as a mouse 640. Other input devices may include a microphone, an infra-red (IR) remote control, a joystick, a game pad, a stylus pen, touch screen, or the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.7 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.7x (a, b, g, etc.) to provide secure, reliable, fast wireless connectivity. A Wi-Fi network can be used to connect computers to each other, to the Internet, and to wire networks (which use IEEE 802.3-related media and functions).

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

Various embodiments may comprise one or more elements. An element may comprise any structure arranged to perform certain operations. Each element may be implemented as hardware, software, or any combination thereof, as desired for a given set of design and/or performance constraints. Although an embodiment may be described with a limited number of elements in a certain topology by way of example, the embodiment may include more or less elements in alternate topologies as desired for a given implementation.

References to "one embodiment" or "an embodiment" mean that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a processor, or any combination thereof.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. A computer-implemented method comprising:
    scanning files automatically at periodic intervals on a computer-readable storage medium with a scanning application to obtain the files metadata;
    generating, with the scanning application, a file list to identify ancillary files associated with an application, the file list comprising an entry for each scanned file, the entry associated with the metadata that includes a filename of the scanned file, an application name of a first application that uses the scanned file, a version, a location, and a bundle ID and comprising a set of identifiers of other applications that may use the file;
    detecting deletion of an application when the application is moved to a deleted files directory wherein the detecting the deletion of an application causes the scanning application to generate a file list specific to the deleted application;
    comparing the file list specific to the deleted application to the file list to identify from the ancillary files associated with the deleted application and determine what other applications use the ancillary files;
    displaying, based on the determination, with the scanning application, a list comprising an entry for each file used by the deleted application, the entry comprising at least the filename and a name of a second application that may use the file, and a selection mechanism to allow a user to select the file for deletion, wherein the scanning application is independent of each of: the deleted application, an operating system, and an uninstall application provided with the deleted application;
    deleting, with the scanning application, an associated file in response to a user selection from the displayed list; and updating the file list when a file is updated, removed or added.

2. The method of claim 1, wherein scanning comprises:
visiting each file on the computer-readable storage medium; and
examining file metadata for each file.

3. The method of claim 1, wherein detecting deletion of an application comprises detecting at least one of:
the application being dragged to the deleted files directory;
the application being selected, and moved to the deleted files directory with a delete key; and
the application being selected, and moved to the deleted files directory with a menu selection.

4. The method of claim 1, wherein scanning comprises scanning a subset of files on the computer-readable storage medium.

5. An apparatus comprising:
a logic device;
a non-transitory computer-readable storage medium comprising a plurality of files;
a scanning application executed by the logic device comprising:
a file scanning module to scan files automatically at periodic intervals on the computer-readable storage medium to obtain the files metadata;
a file list module to generate and update a file list to identify ancillary files associated with an application, the file list comprising an entry for each scanned file, the entry associated with the metadata that includes a filename of the scanned file, an application name of a first application that uses the scanned file, a version, a location, and a bundle ID and comprising a set of identifiers of other applications that may use the file;
an uninstall detection module to detect the deletion of the application when the application is moved to a deleted files directory, wherein the detecting the deletion of an application causes the scanning application to generate a file list specific to the deleted application;
the scanning application to compare the file list specific to the deleted application to the file list to identify from the ancillary files associated with the deleted application and determine what other applications use the ancillary files, to display, based on the determination, a list comprising an entry for each file used by the deleted application, the entry comprising at least the filename and a name of a second application that may use the file, and a selection mechanism to allow a user to select the ancillary file for deletion; wherein the scanning application is independent of each of: the deleted application, an operating system, and an uninstall application provided with the deleted application, to delete an associated file in response to a user selection from the displayed list; and to update the file list when a file is updated, removed or added.

6. The apparatus of claim 5, the file scanning module to visit each file on the computer-readable storage medium; and examine file metadata for each file.

7. The apparatus of claim 5, the uninstall detection module to detect at least one of:
the application being dragged to the deleted files directory;
the application being selected, and moved to the deleted files directory with a delete key; and
the application being selected, and moved to the deleted files directory with a menu selection.

8. A non-transitory machine-readable storage medium comprising instructions for a scanning application that when executed enable a computing system to:
scan files automatically at periodic intervals on a computer-readable storage medium to obtain the files metadata;
generate a file list to identify ancillary files associated with an application, the file list comprising an entry for each scanned file, the entry associated with the metadata that includes a filename of the scanned file, an application name of a first application that uses the scanned file, a version, a location, and a bundle ID and comprising a set of identifiers of other applications that may use the file;
detect deletion of an application, when the application is moved to a deleted files directory wherein the detecting the deletion of an application causes the scanning application to generate a file list specific to the deleted application;
compare the file list specific to the deleted application to the file list to identify from the ancillary files associated with the deleted application and determine what other applications use the ancillary files;
display, based on the determination, a list comprising an entry for of each file from the file list used by the deleted application, the entry comprising at least the filename and a name of a second application that may use the file, and a selection mechanism to allow a user to select the file for deletion, wherein the scanning application is independent of each of: the deleted application, an operating system, and an uninstall application provided with the deleted application;
delete an associated file in response to a user selection from the displayed list; and
updating the file list when a file is updated, removed or added.

9. The storage medium of claim 8, the instructions to detect deletion comprising instructions to detect at least one of:
the application being dragged to the deleted files directory;
the application being selected, and moved to the deleted files directory with a delete key; and
the application being selected, and moved to the deleted files directory with a menu selection.

10. The storage medium of claim 8, the instructions to scan comprising instructions to visit each file on the computer-readable storage medium and to examine file metadata for each file; wherein the instructions to generate the file list comprise instructions to generate the file list with the file metadata.

* * * * *